June 12, 1923.
F. RIEDEL
1,458,595
PROCESS FOR UTILIZING IMPURE GASES OR EXHAUST GASES
CONTAINING CARBON DIOXIDE
Original Filed Aug. 24, 1920
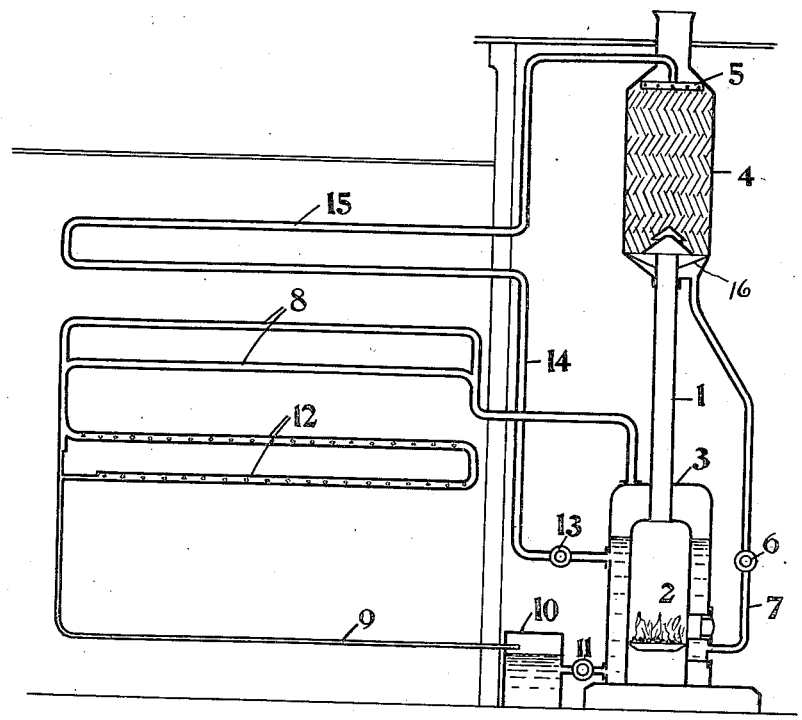
Inventor
Friedrich Riedel
by
W. E. Evans
Attorney.

Patented June 12, 1923.

1,458,595

UNITED STATES PATENT OFFICE.

FRIEDRICH RIEDEL, OF ESSEN, GERMANY, ASSIGNOR TO RIEDEL FERTILIZING PROCESS CO., INC., OF ELIZABETH, NEW JERSEY, A CORPORATION OF NEW JERSEY.

PROCESS FOR UTILIZING IMPURE GASES OR EXHAUST GASES CONTAINING CARBON DIOXIDE.

Application filed August 24, 1920, Serial No. 405,763. Renewed November 10, 1922. Serial No. 600,183.

(GRANTED UNDER THE PROVISIONS OF THE ACT OF MARCH 3, 1921, 41 STAT. L., 1313.)

*To all whom it may concern:*

Be it known that I, FRIEDRICH RIEDEL, a subject of the German State, residing at 29 Heinickestrasse, Essen, Germany, have invented a certain new and useful Process for Utilizing Impure Gases or Exhaust Gases Containing Carbon Dioxide (for which I have filed application in Germany, November 24, 1917, Patent No. 315,019), of which the following is a specification.

Although it is known that any increase of carbon dioxide in the air has an advantageous effect on the growth of plants, every endeavour is made to prevent combustion gases escaping through cracks in the smoke conduits installed in hot-houses and thus getting access to the plants, as experience has shown that the plants suffer.

Besides solid particles, (such as dust, soot, etc.) combustion gases contain small quantities of gases injurious to plant life, such as sulphur dioxid, hydrocarbons, and the like, the former of which is greatly harmful to plant tissue. Purification of these gases has never been considered. I have shown in my pending application, Serial No. 405,762, filed September 8, 1920, that combustion gases when purified are of the greatest utility for the purpose of increasing and assisting the growth of plants.

For highly impure gases the method of purifying would be somewhat involved until all the constituents have been removed one after the other. For this purpose, however, a simple type of apparatus is desirable as this also involves greater working effectiveness.

The main purpose of this invention is, not to purify the combustion gases as a whole, but only to extract the carbon dioxide contained therein, and to subject same to a further process, for the purpose of removing any traces of harmful matter which may not have been entirely separated.

The former may be effected by the use of aqueous solutions of carbonates of the alkali metals, and therefore in a suitable form ready for use; it then possesses the quality of absorbing carbon dioxide while being converted at normal temperature into bicarbonate and on being subjected to heat is re-converted into its original chemical form by giving up the carbon dioxide.

While the carbon dioxide may be chemically separated from the other gases in this manner, it is still possible that small quantities of the latter are mechanically retained during the washing process pass into the bicarbonate solution and then recombine with the carbon dioxide.

Small quantities of hydrocarbons are not very harmful to plant life, but even small traces of sulphur dioxid are harmful.

One feature of this invention is therefore to neutralize the sulphur dioxid by additions (for example soda lye) to the solution of bicarbonate of sodium.

The supply and distribution of the carbon dioxide may, for instance, be effected by means of a mechanically driven bellows and pipes. The distribution of the comparatively small quantities of carbon dioxide in this concentrated form would not be uniform.

This drawback may be avoided, and certain advantages gained, if the supply is carried out as hereafter described.

According to the invention the solution of bicarbonate is heated until the steam given off is raised to a pressure sufficient to carry along the now rarefied carbon dioxide. As the gas is now ready for use for plant culture, this mixture of carbon dioxide and steam may be let into the conservatory which it is desired to treat with gas; if, however, a drier carbon dioxide is desired, the explusion of the gas from the pipe is allowed only after the steam has been cooled and precipitated.

The simultaneous production of water vapour has an additional advantage. If any small quantity of sulphur dioxid should pass into the pipes, which may happen if the neutralizer in the boiler is consumed or for any other reason, the presence of the steam will prevent its expulsion from the pipe.

The propensity of sulphur dioxid in the presence of water is to become converted into sulphurous acid, and consequently it will be precipitated with the water vapour, dissolve and be carried off with the condensed water. The carbon dioxide which will now be expelled from the pipe is perfectly pure and clean; in any case the effect of the wider distribution is to reduce any small traces of poisonous constituents to an absolutely harmless quantity. By this method, even fuel or combustion gases containing a very large amount of sulphur may produce perfectly pure and clean carbon dioxide, which may safely be used for botanical purposes, a perfectly pure carbon dioxide gas having access to the air surrounding the plants being assured, which is not harmful to plant life but assists the growth of the plants.

The carrying forward of the carbon dioxide by means of steam also allows, in installations where heating is required, the production of steam to be increased and the arising mixture of carbon dioxide and steam to be used for the purpose of heating the conservatory.

According to this invention a surprisingly simple arrangement may be installed and this may be readily seen in the accompanying drawing, which shows one form of installation as used in a conservatory.

Above the outlet pipe 1 of the furnace 2, of the boiler 3, a vessel 4 is placed containing a filling material having a large surface. By means of the distributing pipe 5 a solution of alkali (sodium or potassium) carbonate at normal temperature is caused to trickle down upon the filling material and therefore has ample opportunity to absorb the carbon dioxide from the combustion gases rising to meet it. If carried out as above described the other constituents of the combustion gases, and more especially the harmful parts, such as sulphur dioxid and the like, escape freely into the air. By the absorption of the carbon dioxide a bicarbonate solution is obtained.

In order to keep back any solids, such as dust, soot and the like, the solution is first filtered and the filtered solution then forced by pump 6 through the pipe 7 into the boiler 3. The pumps 13, 6 and 11 are controlled to maintain a more or less constant level of fluid in the boiler 3. The method by which pure carbon dioxide is obtained and carried off has been explained above. In the case above described the mixture of carbon dioxide and steam generated in the boiler is also utilized for the purpose of heating the conservatory. This would be the more advantageous, as the specific heat of carbon dioxide is somewhat greater than that of water vapour. The water which by condensation in the pipes 8 is precipitated is led off through the pipe 9 into a tank 10, where any small quantity of sulphurous acid is neutralized, and is then forced by means of the pump 11 into the boiler 3.

Where the steam commences to condense, the upper part of the pipes 12 are provided with a number of small holes, which allow the carbon dioxide to escape into the air which envelops the plants and gives it access to the plants. Any escaping steam must be compensated for by additions to the feed water.

By the heating of the bicarbonate solution and the consequent separation of the carbon dioxide the former returns to its original chemical composition of carbonate solution and consequently becomes capable of again absorbing carbon dioxide.

For the purpose of utilizing this solution again, it is drawn off by means of a pump 13, from below the waterline of the solution contained in the boiler 3 and led through the pipe 14 to the distributing pipe 5, and the same cycle of operation recommences.

As a cool solution has a greater power of absorption, it is necessary to cool it down for which reason it must pass through the cooling pipe 15 which may at the same time be used for heating purposes.

It is advantageous to pass the combustion gases into the absorber cooled down as much as possible so that the solvent is evaporated as little as possible and there is the largest degree possible of absorption of carbon dioxide. If required, the necessary draught for the furnace may be obtained by placing a bellows in the exhaust. In order to avoid faults one should of course use a furnace free of smoke and soot. There is no reason why the described method of obtaining pure carbon dioxide for botanical purposes may not be used in the case of other noxious carbon dioxide containing gases of any kind. This invention covers the use of other equally effective salt solutions in place of the alkali metal carbonates mentioned.

By means of the described method, hitherto useless and wasted quantities of carbon dioxide from noxious fumes of any description, are utilized for the preservation and increase of plants, in a most simple manner, whereby the absolute purity of the carbon dioxide is guaranteed with the greatest security and economy.

I claim:

1. Process of supplying carbon dioxide, free from noxious concomitants, to the atmosphere enveloping growing plants, which consists in extracting carbon dioxide from impure carbon dioxide containing gases by means of salt solutions having an affinity for carbon dioxide, then releasing carbon dioxide from said solution by means of heat, the heat being of such degree that water vapor is formed from the said solution in such volume and under such pressure as to drive forward the carbon dioxide and to distribute it in the vicinity of the plants, while, during the thus induced travel of the carbon dioxide, depriving it of the traces of injurious accompanying gases by taking up the latter in water of the condensing water vapor and then removing said contaminated condensed water without permitting the gases absorbed by it to become effective in the atmosphere enveloping the plants.

2. Process of supplying carbon dioxide, free from noxious concomitants, to the atmosphere enveloping growing plants, which consists in extracting carbon dioxide from impure carbon dioxide containing gases by means of salt solutions having an affinity for carbon dioxide, said solutions being treated to contain a neutralizing agent for traces of substances injurious to plant life, then releasing carbon dioxide from said solution by means of heat, the heat being of such degree that water vapor is formed from the said solution in such volume and under such pressure as to drive forward the carbon dioxide and to distribute it in the vicinity of the plants, while, during the thus induced travel of the carbon dioxide, depriving it of the traces of injurious accompanying gases by taking up the latter in water of the condensing water vapor and then removing said contaminated condensed water without permitting the gases absorbed by it to become effective in the atmosphere enveloping the plants.

3. Process of supplying carbon dioxide, free from noxious concomitants, to the atmosphere enveloping growing plants, which consists in extracting carbon dioxide from impure carbon dioxide containing gases by means of salt solutions having an affinity for carbon dioxide, then releasing carbon dioxide from said solution by means of heat, the heat being of such degree that water vapor is formed from the said solution in such volume and under such pressure as to drive forward the carbon dioxide and to distribute it in the vicinity of the plants, while, during the thus induced travel of the carbon dioxide, depriving it of the traces of injurious accompanying gases by taking up the latter in water of the condensing water vapor and then removing said contaminated condensed water without permitting the gases absorbed by it to become effective in the atmosphere enveloping the plants, adding a neutralizing agent to the said contaminated condensed water sufficient at least to neutralize the said extracted injurious constituents and returning said neutralized fluid to the first named salt solution which serves to extract the carbon dioxide from the gases under treatment.

4. Process of supplying carbon dioxide, free from noxious concomitants, to the atmosphere enveloping growing plants, which consists in maintaining heat by combustion of fuel to establish primarily a desired temperature in the region of growing plants, leading off the products of combustion and on their way to the stack interposing to their passage finely distributed streams of a relatively cool salt solution having an affinity for carbon dioxide, leading the solution thus treated to the immediate neighborhood of the ignited fuel and utilizing a part of the heat created by such fuel to drive off from the solution not only carbon dioxide but also a part of its water contents as water vapor, the volume and pressure of the latter being maintained in such degree as to drive forward the carbon dioxide and to distribute it in the vicinity of the plants, depriving the said carbon dioxide during its thus induced travel, of the traces of injurious accompanying gases by taking up the latter in water of the condensing water vapor and then removing said contaminated condensed water without permitting the gases absorbed by it to become effective in the atmosphere enveloping the plants.

5. Process of supplying carbon dioxide free from noxious concomitants to the atmosphere enveloping growing plants which consists in maintaining a supply of relatively pure carbon dioxide under pressure and under said pressure driving forward and distibuting in the vicinity of the plants, said carbon dioxide and during the thus induced travel of carbon dioxide leading it through long passages past walls maintained at a temperature adapted to cause condensation of such water vapor as may accompany the carbon dioxide and then causing the carbon dioxide to leave said passage and said walls and to become commingled with the atmosphere enveloping the plants at a point in the close vicinity of such plants without permitting absorption products contained in the condensed water collected in the passage to become effective in the atmosphere enveloping the plants.

FRIEDRICH RIEDEL.